(12) United States Patent
Sterud

(10) Patent No.: US 6,622,987 B2
(45) Date of Patent: Sep. 23, 2003

(54) LIVELOAD ASSEMBLY FOR VALVE

(75) Inventor: Curtis George Sterud, Garden Grove, CA (US)

(73) Assignee: Control Components, Inc., Rancho Santa Margarita, CA (US)

( * ) Notice: Subject to any disclaimer, the term of this patent is extended or adjusted under 35 U.S.C. 154(b) by 140 days.

(21) Appl. No.: 09/959,016

(22) PCT Filed: Feb. 15, 2001

(86) PCT No.: PCT/GB01/00607

§ 371 (c)(1),
(2), (4) Date: Oct. 12, 2001

(87) PCT Pub. No.: WO01/61229

PCT Pub. Date: Aug. 23, 2001

(65) Prior Publication Data

US 2002/0158221 A1 Oct. 31, 2002

(30) Foreign Application Priority Data

Feb. 15, 2000 (GB) .............................................. 0003462

(51) Int. Cl.⁷ .............................................. F16J 15/18
(52) U.S. Cl. ...................................... 251/214; 277/523
(58) Field of Search ....................... 251/214; 277/523, 277/522

(56) References Cited

U.S. PATENT DOCUMENTS

| | | | | |
|---|---|---|---|---|
| 3,162,455 A | * | 12/1964 | Englert et al. | 251/214 |
| 3,262,709 A | * | 7/1966 | Hanesen et al. | 251/214 |
| 3,787,060 A | * | 1/1974 | Astill | 251/214 |
| 4,640,305 A | * | 2/1987 | Johnson | 251/214 |
| 4,745,938 A | * | 5/1988 | Nimberger et al. | 251/214 |
| 4,773,442 A | * | 9/1988 | Lephilibert | 251/214 |
| 5,192,049 A | * | 3/1993 | Ridge | 251/214 |
| 5,195,756 A | * | 3/1993 | Wachter | 251/214 |
| 5,326,074 A | * | 7/1994 | Spock, Jr. et al. | 251/214 |
| 5,456,447 A | * | 10/1995 | Reynolds | 251/214 |
| 5,549,305 A | * | 8/1996 | Freund | 277/511 |

* cited by examiner

Primary Examiner—Gene Mancene
Assistant Examiner—John Bastianelli
(74) Attorney, Agent, or Firm—Stetina Bruda Garred & Brucker

(57) ABSTRACT

A valve stem sealed by a packing. A spigot applies an axial compression loading to the packing via a sleeve when bolts are tightened. A clamp attaches two parts of the valve body to each other with the bolts extending between the spigot and the clamp. The bolt and spigot provide an integral spring construction.

16 Claims, 6 Drawing Sheets

LIVELOAD ASSEMBLY FOR VALVE

This invention relates to valves of the type having a valve stem and particularly to the sealing of the stem to the sleeve or passage in which it moves.

A valve stem may have a turning or sliding movement within its sleeve to open or close the valve—or a combination of both movements—and the sealing of the stem must be adequate to contend with that movement whilst ensuring maintenance of fluid tightness against the pressure of fluid in the valve. A widely used type of stem sealing is a compression packing in which a gland, which may be bolted or threaded, applies a compressive force to a soft compression packing in a stuffer box surrounding a portion of the length of the stem. The resulting radial pressure of the packing onto the stem provides the desired seal so long as the radial pressure exceeds the pressure of fluid in the valve.

Compression may be applied to the packing by means of packing bolts which are each attached at one end to a clamp around the valve body and at their other end to a spigot, a flange or other projection bearing on, integral with or attached to the gland or sleeve which bears onto the packing. Tightening of the bolts, therefore, increases the pressure on the packing and thereby provides the radial pressure onto the stem.

It is also known to attach a spring between the nut used to tighten the bolt and the surface of the spigot or flange. Although coil springs could be used, it is conventional practice to use so-called Belleville springs which are essentially formed as a series of dished washers. Such springs have a higher compression rating than a simple coil spring. The use of these springs provides a "live-loaded" packing which can automatically compensate for changes that may take place in the packing under operating conditions of the valve, for example high pressures and temperatures. The volume of the packing material may reduce under operating conditions and, whereas this could harmfully effect the sealing of the stem in an unsprung valve, the spring pressure will compensate for this reduction and maintain required pressure. Alternatively, if the packing volume increases, which can happen with certain packing materials, the radial pressure on the stem in an unsprung valve could increase too much and possibly cause sticking of the stem. The spring valve, however, can accommodate the pressure increase by means of further compression of the springs.

Thus, the "live-loaded" packing construction can provide a useful amount of self-adjustment to maintain the correct pressure through the packing onto the valve stem.

However, conventional "live-loaded" packing constructions have disadvantages in that they require the provision of longer bolts than would otherwise be required in order to accommodate the springs and they require sufficient clearance beyond the spigot or gland flange to accommodate the longer bolts and the springs. In particular this may cause difficulties in fitting a "live-loaded" packing construction to existing valves.

It is, therefore, an object of the present invention to provide an improved "live-loaded" packing construction of more compact size and not requiring extra-length bolts.

Accordingly, in one aspect, the invention provides a valve having a body defining a passage, a valve stem movable in the passage to open and close the valve, a packing surrounding a portion of the length of the valve stem, a sleeve bearing axially at one of its ends onto the packing to compress it, the sleeve carrying at its other end a spigot or flange extending radially outwardly and bolts passing through and secured to the spigot or flange adjacent one of the bolt ends, the other end of each bolt being secured to a clamp which is clamped to the valve body, the bolts and the spigot or flange providing an integral spring construction.

Preferably the spigot may be in the form of a pair of integrally-formed arms diametrically opposed across the sleeve but if it is desired to use three or more arms they should be equi-spaced around the sleeve to ensure that uniform compression is applied to the packing.

In one specific embodiment of the invention the integral spring construction is provided by one or more slots in the arms of the spigot. The or each slot preferably extends generally in the radial direction in a plane perpendicular to the axis of the sleeve and provides a recess in the arm. The arm is thereby effectively divided into branches which can be forced nearer together by means of tightening of the bolt that passes through them. The arm branches in conjunction with the bolt act as an integral spring that can accommodate changes in volume of the packing in a similar manner to that described above. In other words, when the nut is tightened on its bolt, the branches of the arm are forced to deflect towards each other, or one may deflect towards the other, thereby maintaining a stored energy load which is transmitted to the packing.

The arm branches may be substantially parallel prior to tightening the nut to force the branches nearer together to achieve the desired loading. Alternatively, the arm branches may be relatively divergent prior to tightening the nut. For example, the arm branches may diverge at an angle of 5° or less, preferably 1°±½° towards the free ends thereof.

In another specific embodiment of the invention the integral spring construction is provided by the bolts having one or more sinusoidal bends along their length. The bend or bends provide a "spring" action to the bolts whereby they can store energy under compression and thereby act to maintain compressive force on the packing, if and when its volume changes.

Preferably, means is provided to limit the stored energy load when the nut is tightened on the bolt. In this way the integral spring construction can be pre-loaded up to a predetermined limit and overloading is prevented. The limit means may comprise a stop which can be fixed to provide a set pre-load or adjustable to provide a variable pre-load.

Thus, from another aspect, the present invention provides a valve having a valve stem, and a compression and packer assembly including packing surrounding a portion of the valve stem, means for axially compressing the packing to pre-load the packing and means to limit the pre-load applied to the packing.

Where the integral spring construction is provided by slots in the arms of the spigot, the depth of a slot, i.e. the distance between the branches that it separates, may conveniently be made oversize as this may render its manufacture easier. To ensure that the correct amount of deflection of a branch towards its neighbour then occurs, one or more appropriately sized washers can be fitted around the bolt to lie between the branches and to reduce the slot depth. The maximum amount of branch deflection can thereby be accurately controlled by selectively varying the size and/or number of washers between the arm branches.

Accordingly in another aspect the invention provides a kit of parts for a valve of the type having a body defining a passage, a valve stem movable in the passage to open and close the valve, a packing surrounding a portion of the length of the valve stem and a sleeve bearing axially on the packing to compress it, the kit comprising a spigot or flange to bear against the sleeve, the spigot or flange comprising at least two arms, each arm having a radially extending slot dividing the arm into two spaced branches, each arm being bored to receive a bolt whereby the spigot or flange may be clamped to the valve, and a washer to fit over the bolt between the branches, the washer being of thickness to reduce the distance between the branches to permit a maximum predetermined deflection therebetween.

Where the integral spring construction is provided by the bolts, the extension of the bolt may be controlled by any suitable means to limit the stored energy load. For example, the bolt may have a fixed or adjustable collar providing a stop to limit the pre-load obtained when the nut is tightened.

Thus, in yet another aspect the invention provides a kit of parts for a valve of the type having a body defining a passage, a valve stem moveable in the passage to open and close the valve, a packing surrounding a portion of the length of the valve stem and a sleeve bearing axially on the packing to compress it, the kit comprising a spigot or flange to bear against the sleeve, the spigot or flange comprising at least two arms, each arm being bored to receive a bolt whereby the spigot or flange may be clamped to the valve, each bolt having an integral spring portion whereby the bolt can be stretched to control loading of the packing, and means to limit extension of the bolt to permit a maximum predetermined loading to be applied to the packing.

The packing may be any suitable or conventionally used material or construction. Thus it may be contained in a packing box surrounding the valve stem where it may be compressed axially between a portion of the valve body and a movable sleeve or gland. The packing may be in the form of a multiplicity of rings of the packing material. It may also include a lantern ring through which any leakage of fluid from the valve can be let to a safe area instead of leaking to atmosphere.

The skilled man of the art will be able to determine the required slot or "spring bolt" dimensions for his particular requirements and a means of determining this for a slotted arm spring is outlined with reference to FIG. 9 below.

Embodiments of the invention will now be described by way of example only with reference to the accompanying drawings in which.

Figure 1:
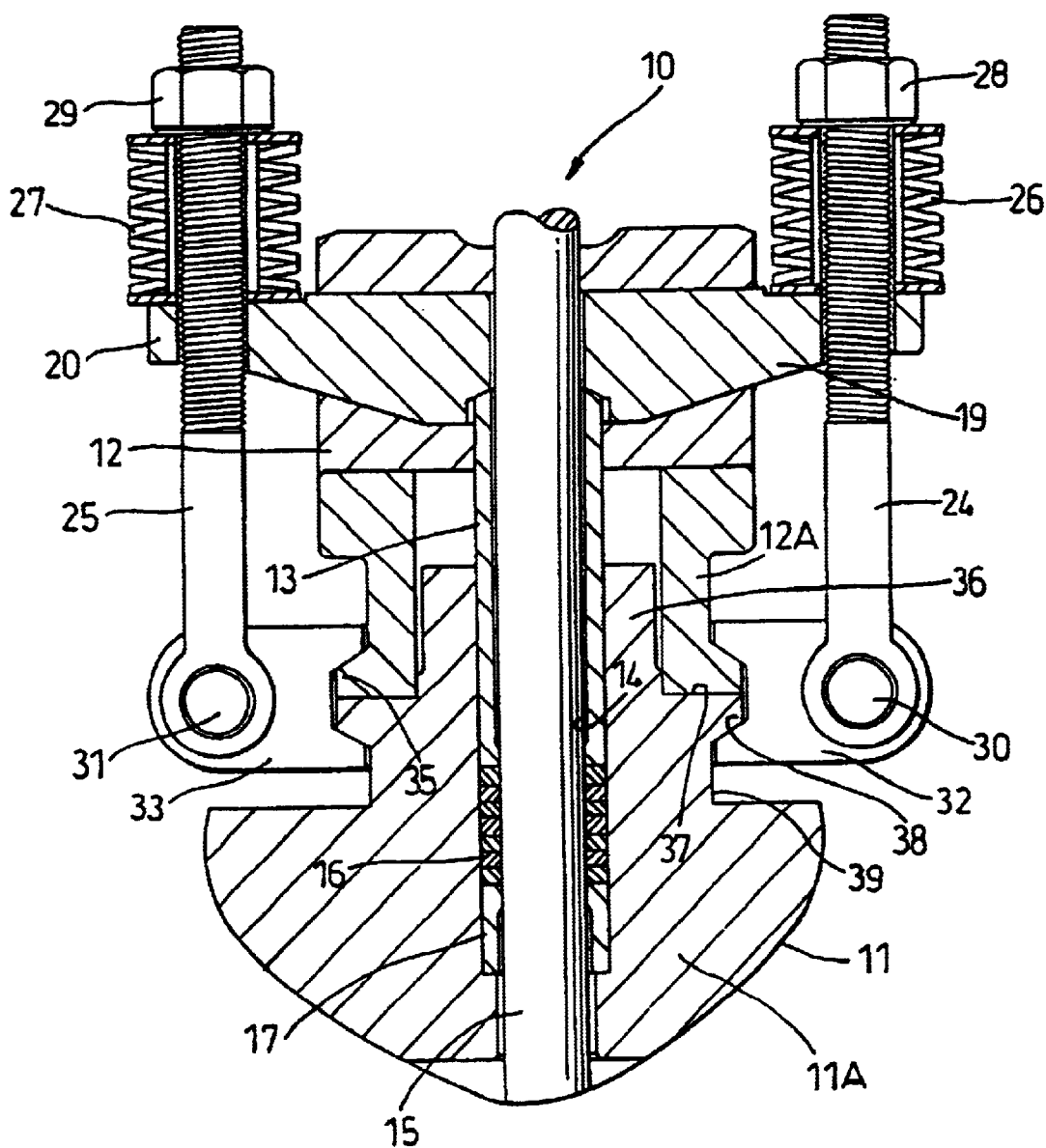
FIG. 1 is a diagrammatic representation of a conventional "live-loaded" valve construction.
Figure 2:
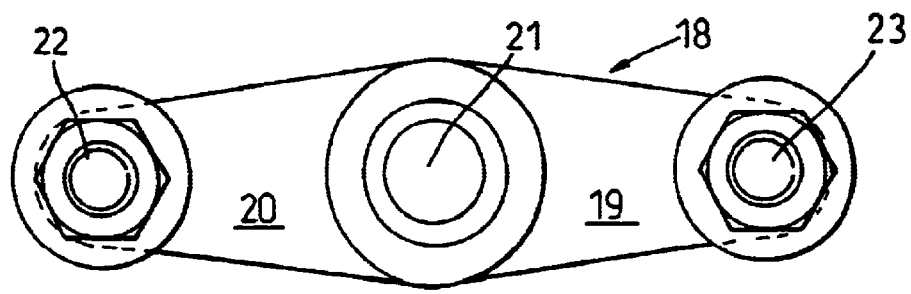
FIG. 2 is a plan view of the spigot used in FIG. 1.
Figure 3:
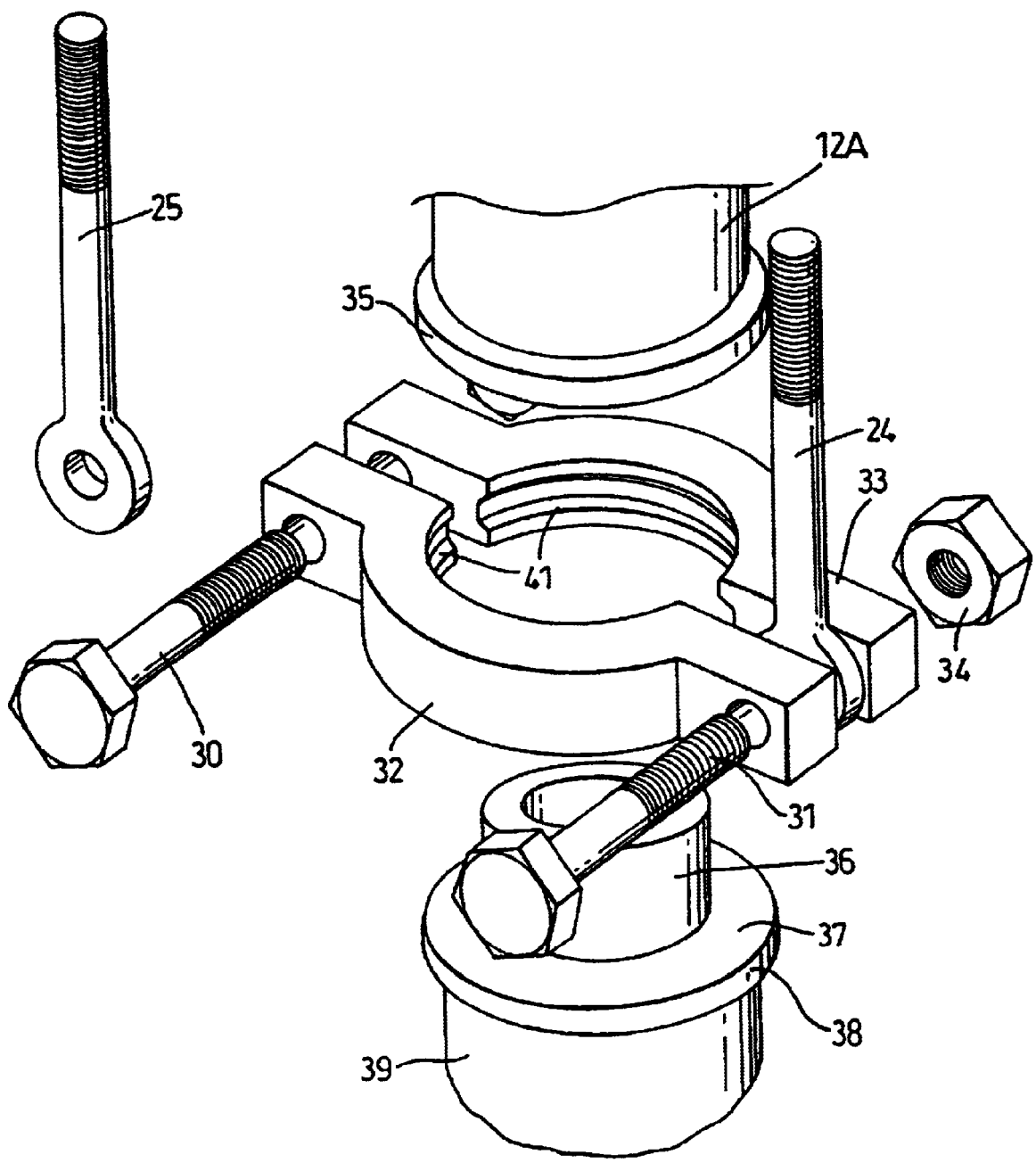
FIG. 3 is an exploded view of a portion of the valve of FIG. 1.

In FIGS. 1, 2 and 3 a valve 10 has a body comprising a bonnet 11 and, a yoke 12, with a sleeve or gland 13 surrounding a central axial passageway 14, through which passes a valve stem 15, movement of which opens and closes the valve in conventional manner. The lower end of sleeve 13 bears on and compresses an annular packing 16 which surrounds and exerts radial pressure on that portion of stem 15 passing through the packing. Beneath the packing is fixed ledge or body portion 17 against which the lower part of the packing bears.

At the upper end of sleeve 13 is a gland spigot 18 in the form of an integral pair of arms 19, 20 extending in radially opposed directions from the stem. As shown more clearly in FIG. 2, the spigot 18 has a central bore 21 through which stem 15 passes and a bore 22, 23 adjacent the radially outer end of each arm 19, 20 to receive a packing bolt 24, 25. A spring 26, 27 is positioned on each bolt above its respective arm 18, 19 and tightened to the desired force by a nut 28, 29 on the threaded ends of the bolts.

The opposite, lower end of each bolt 24, 25 is enlarged and bored to receive a clamping bolt 30, 31 whereby clamping is achieved via a split yoke clamp 32, 33 to the valve yoke and bonnet. This is shown in exploded view in FIG. 3, clamping bolts 30, 31 being tightened by nuts 34 (only one being visible). The lower portion 12A of the yoke is an annular ring having a radially-outward angled flange 35 at its lower extremity. Bonnet 11 has a stepped upper profile with an annular upper portion 36 fitting within the annular ring of yoke portion 12A. Flange 35 of the yoke sits on step 37 of the bonnet. Step 37 is defined above an angled radially outward flange 38 which leads via an annular neck portion 39 to the inverted mushroom-shaped base 11A of the bonnet.

Flanges 35 and 38 are retained within a corresponding shaped annular recess 41 in the interior face of clamp 32, 33 the clamp thereby holding the valve body parts together.

The compression of springs 26, 27, which may be Belleville springs, transmits an adjustable load via spigot 18 and sleeve 13 to the packing 16 and thereby maintains a radial pressure on stem 15 to prevent leakage of fluid from the valve.

As is clear from FIG. 1, packing bolts 24, 25 are extended in length above spigot 18 to accommodate the springs 26, 27.

Figure 4:
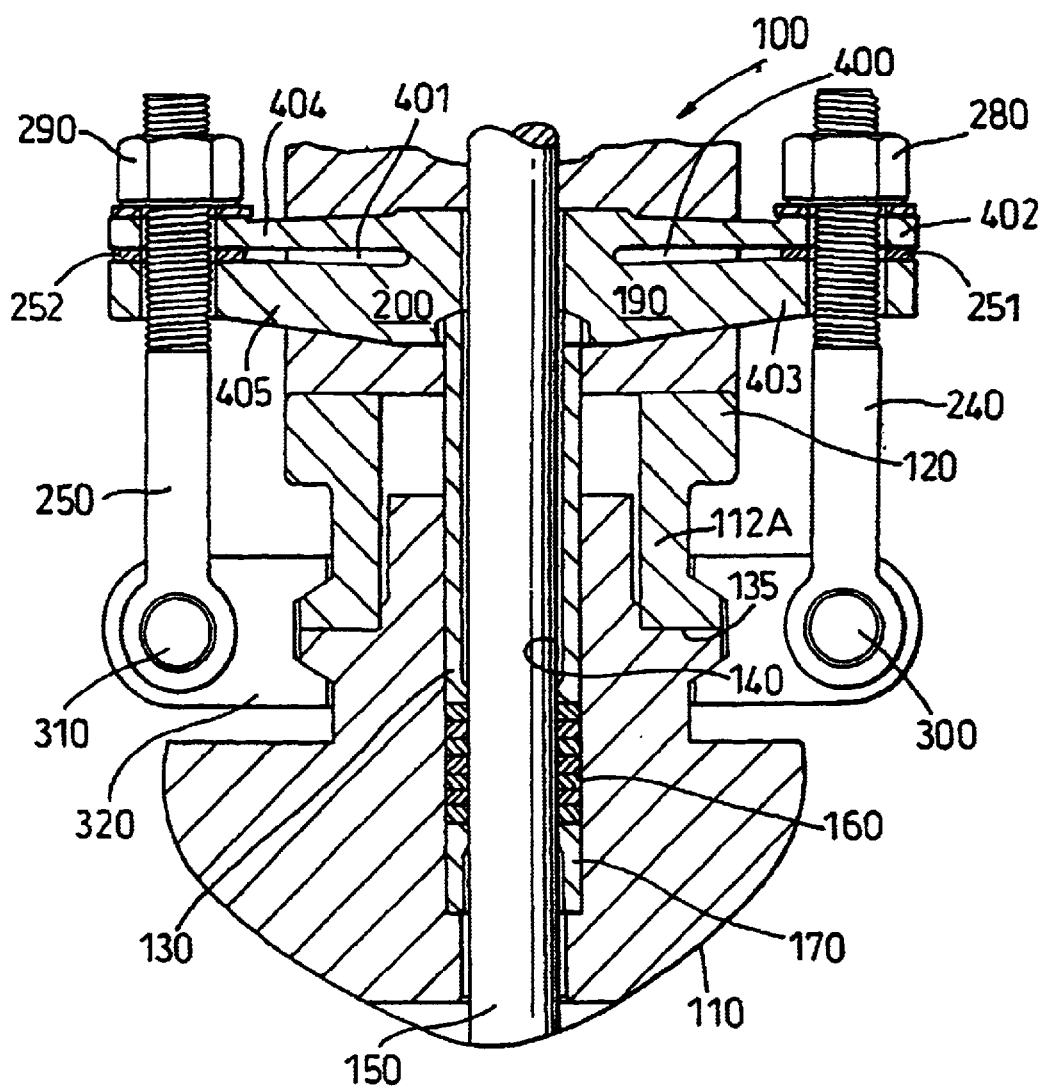
FIG. 4 is a similar view to FIG. 1 of one form of valve according to the invention.
Figure 5:
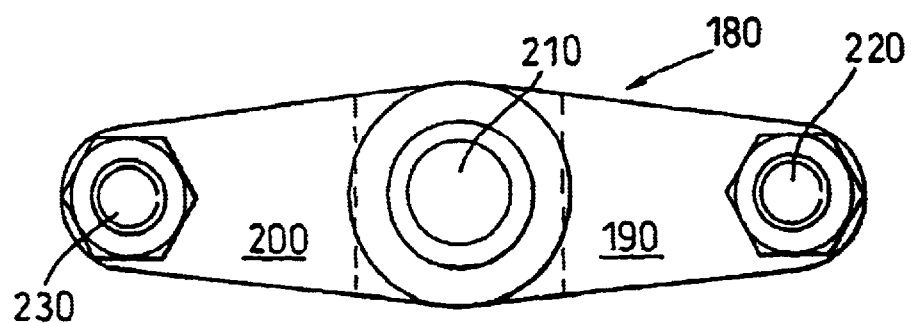
FIG. 5 is a plan view of the spigot used in FIG. 4.
Figure 6:
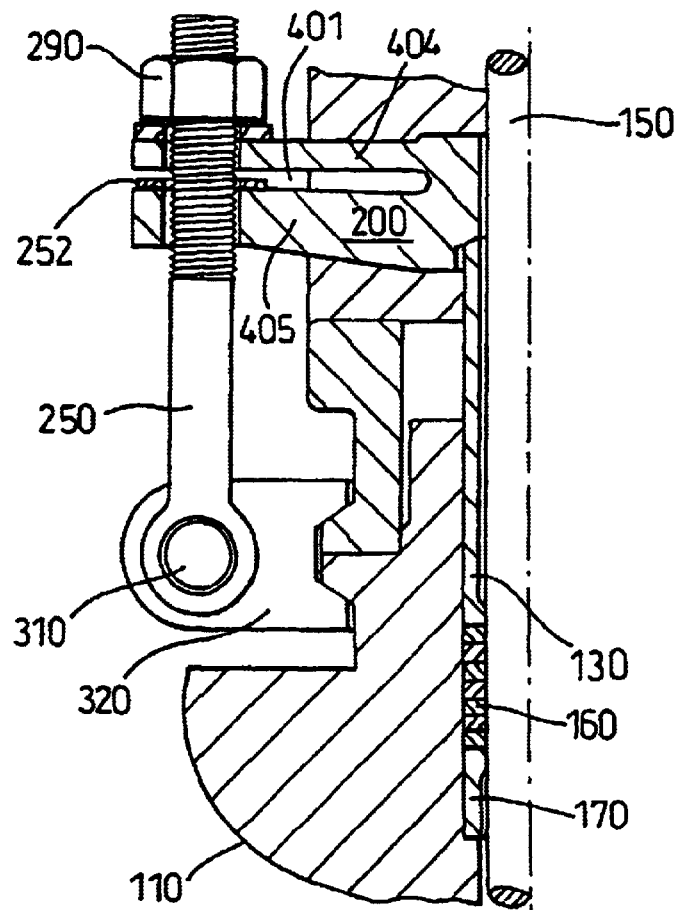
FIG. 6 is a view of one half of the valve of FIG. 4 before the bolts are tightened.

In FIGS. 4, 5 and 6 is shown a valve construction of the invention in which the springs 26 and 27 are eliminated and shorter bolts thereby being allowed.

Like parts in FIGS. 4, 5 and 6 with respect to FIGS. 1, 2 and 3, are given the addition of zero to their reference numerals. Moreover, it will be appreciated that the clamping arrangement shown in FIG. 3 may be used identically with the FIGS. 4, 5 and 6 construction.

Thus valve 100 has a bonnet 110, a yoke 120, a sleeve or gland 130 surrounding an axial passageway 140 through which passes a valve stem 150. The lower end of sleeve 130 bears on annular packing 160 which thereby exerts radial pressure on stem 150. The lower part of the packing bears on a fixed ledge 170.

At the upper end of sleeve 130 is a gland spigot 180 in the form of an integral pair of arms 190, 200, extending in radially opposed directions from the stem. Again, as shown more clearly in FIG. 5, spigot 180 has a central bore 210 through which stem 150 passes and a bore 220, 230 adjacent the radially outer end of each arm to receive a packing bolt 240, 250.

The opposite lower end of each bolt 240, 250 is enlarge and bored to receive a clamping bolt 300, 310 for a two-part yoke clamp (320). As indicated above, the clamping arrangement may be the same as is shown in FIG. 3 and so is not described again in detail here.

In this embodiment the required spring arrangement is provided by a radially-extending slot 400, 401, one in each arm 190, 200. The slots 400, 401 divide their respective arms into two branches, upper branches 402, 403 and lower branches 404 and 405 respectively. Tightening of nuts 280, 290 on the threaded ends of bolts 240, 250 forces arm branches 402, 403 and 404, 405 together, the arms thereby acting as springs with the loading so produced, being transmitted, as before, to the packing 160 via the arms and sleeve 130 and from the packing radially to stem 150.

In FIG. 6 is shown the position before the nuts 280, 290 are tightened in comparison with FIG. 4 where tightening has taken place. As can be seen in FIG. 6, the arm branches 404 and 405 are generally parallel prior to tightening. On tightening, the width of slot 401 between arm branches 404 and 405 is reduced as shown in FIG. 4. Indeed, the slot 401 is shown completely closed in the region of bolt 250 where branches 402 and 404 now bear directly at their outer ends onto washers 251 and 252 around the bolts 240 and 250 respectively. More than one washer may be employed between the arm branches and it will be appreciated that the number and/or thickness of the washers may be varied and is selected to provide the required degree of deflection of branches 402 and 404 to produce the required loading.

Figure 7:
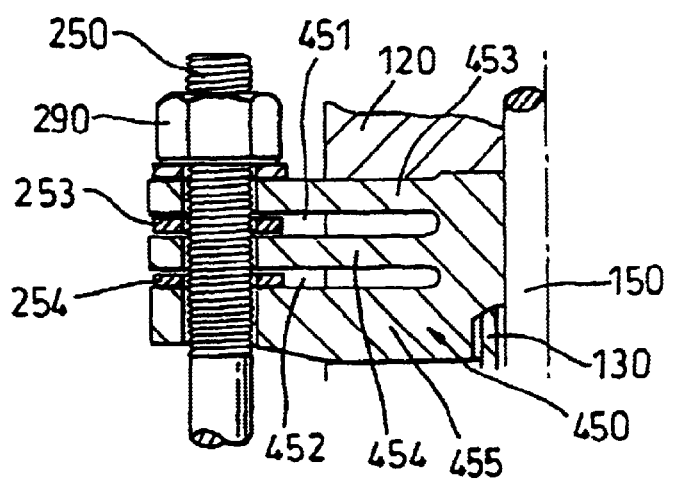
FIG. 7 is a scrap view showing a modified arm of the invention.

A modified arm is shown in FIG. 7. In this embodiment the arm 450 has a pair of spaced radially-extending slots 451, 452 which define upper 453, intermediate 454 and lower 455 branches of the arm. (The other visible parts are numbered as in FIG. 4). Tightening of the bolt 250 by nut 290 again forces arms branches 453, 454, 455 towards each other, thereby loading a compression force onto the packing (not visible in FIG. 7). Again, washers 253 and 254 around the bolt are selected to allow the desired degree of deflection of arms 453 and 454 respectively. The use of two slots reduces the stress per branch of the arm for the same total energy load induced.

It will be appreciated that the length, depth and spacing of the slots can be varied to achieve different spring load capacities and will also vary with the material from which the arm is manufactured. Preferred materials are heat-treated alloy steels, e.g. chrome-molybdenum steel, or precipitation hardened stainless steel.

Figure 8:
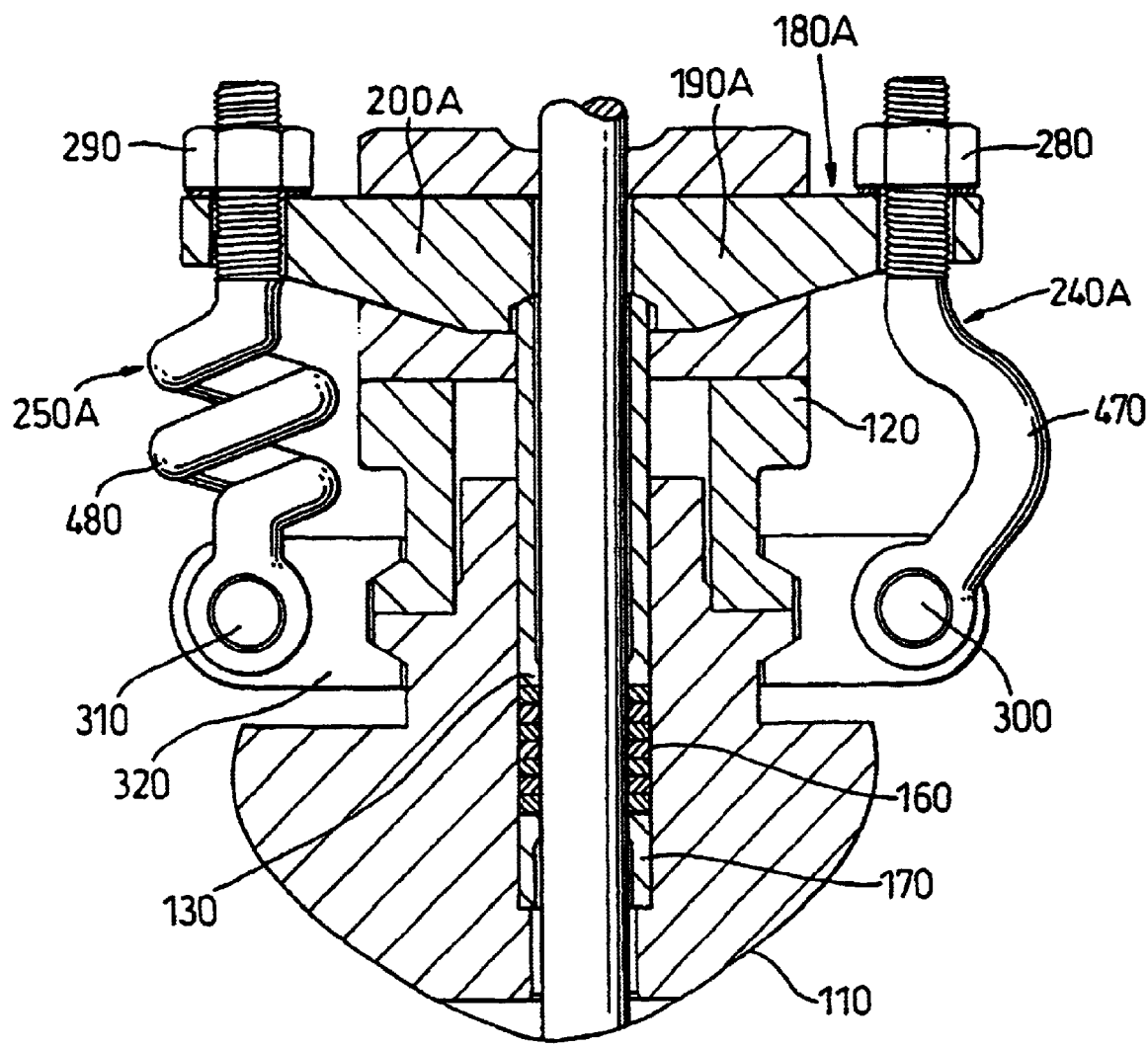
FIG. 8 is a composite diagrammatic representation of a valve construction having two different spring bolts.

In FIG. 8 are shown two versions of the embodiment of the invention in which the packing bolts are designed to act as springs. Again like parts are numbered as in FIG. 4.

The right hand packing bolt 240A shown in FIG. 8 has a single sinusoidal bend 470 between its threaded upper end and bored lower end.

This bend provides the desired spring effect under load applied by tightening of nut 280.

The right hand packing bolt 250A has a coil-spring-shaped intermediate portion 480 between its threaded upper end and bored lower end. Again the bolt provides the desired spring effect to apply compression to the packing 160. Bolts 240A and 250A being placed under spring loading can, therefore, accommodate the possible changes in packing volume that may occur in use of the valve.

It will be appreciated that in the FIG. 8 embodiments, the sleeve flange 180A does not require slots in its arms 190A, 200A.

In both the FIG. 8 embodiments, the load obtained when the nuts 280 are tightened may be controlled to provide a desired pre-load by the provision of a stop to limit the extension or stretching of the "spring" portion 470,480 of the bolts 240A,250A. For example, the bolts 240A, 250A may have a collar (not shown) engageable with the arms 190A,200A to limit the applied pre-load. The collar may be fixed or it may be adjustable, for example the collar may be located on a threaded portion of the bolts 240A,250A to allow the degree of pre-load to be varied as desired. Other stop arrangements to achieve the same effect may be employed such as a C-shaped hook which limits the "stretch" of the spring portion of the bolts and thus the pre-load obtained by deflection of the spring portion. The C-shaped hook or other device may provide a fixed deflection or be adjustable to vary the deflection.

Figure 9:
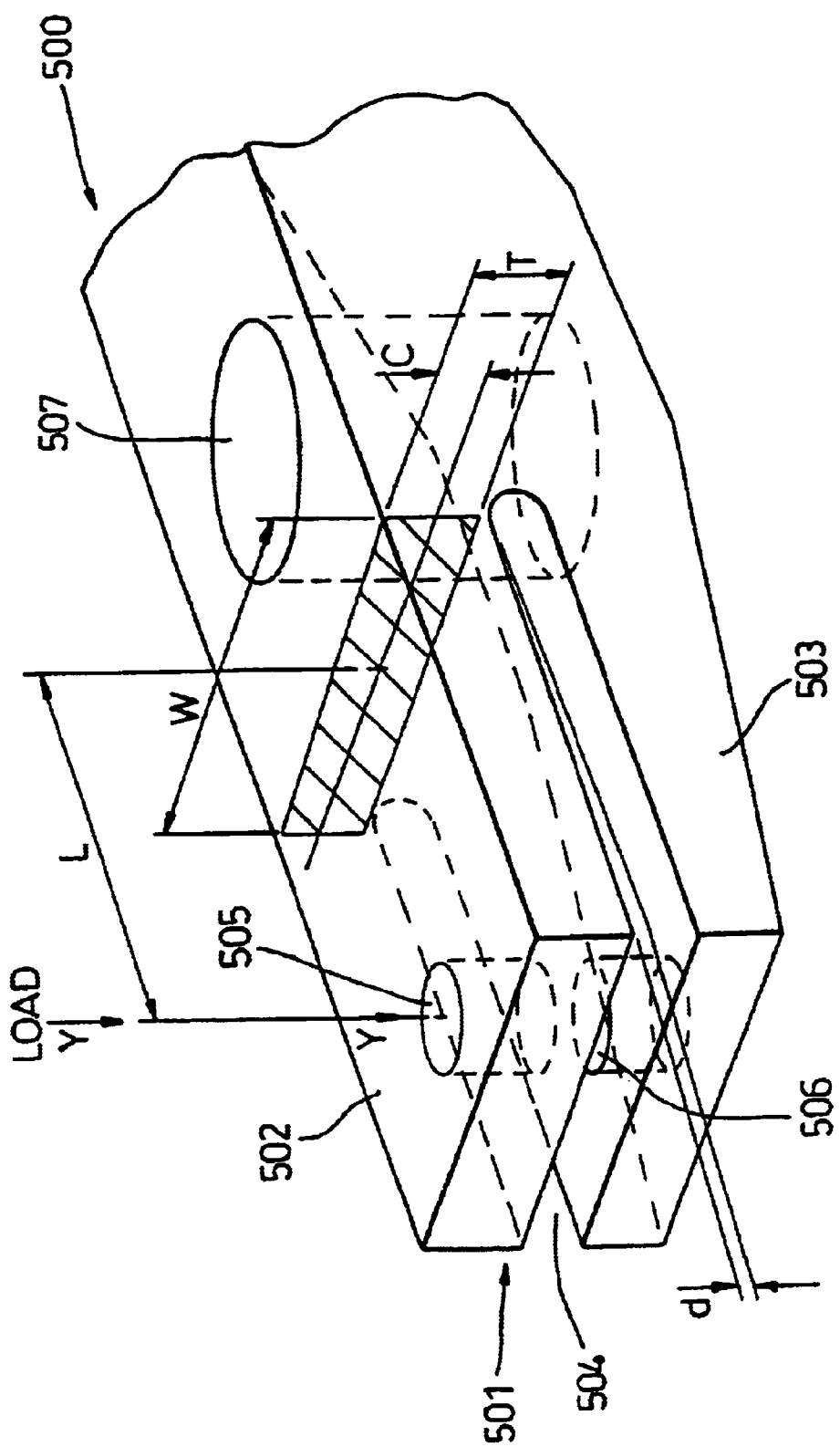
FIG. 9 is a diagrammatic representation of a slotted arm of a spigot or flange for use in the invention.

In FIG. 9, is shown one arm 501 of a spigot or gland flange 500 of the invention. Arm 501 is divided into two branches 502,503 by a slot 504. The branches each contain a bore 505,506 to receive a packing bolt and the spigot has a central bore 507 through which a valve stem can pass.

The arm has a width "W" and the upper branch 502 has a thickness "T" or 2"C". A deflection "d" of branch 502 towards branch 503 is indicated for the purpose of this calculation. Branch 502 has a length "L" from its root to the centre of its bolt hole 505.

For a given valve stem diameter and valve operating pressure, there will be a particular load required on the stem packing for effective sealing. That sealing load divided by the number of packing bolts is the load "Y", which is required to provide the deflection "d". The spigot or gland flange 500, therefore, is designed to achieve load "Y" at a reasonable amount of deflection "d" and wherein the stress produced does not exceed a particular maximum value, e.g. 100,000 p.s.i., for a steel spigot having a tensile strength of 150,000 p.s.i., i.e. to leave an adequate safety margin.

A suitable calculation can then be made using the following:

If a 2000 lbs load is required on the packing, for a spigot with two arms and two packing bolts, a load "Y" of 1000 lbs is required at each arm as shown. Using the following relationships in which I=Moment of Inertia (inch$^4$); K=Spring Rate (lbs/inch deflection); S=Bending Stress (lbs/inch$^2$); M=Bending Moment; and E=Modulus of Elasticity of the material:

$I = W \times T^3/12$ $K = 3EI/L^3$ $M = LY = dK$ $C = 0.5T$ $S = MC/I$ it is possible to calculate that a deflection "d" of, by way of example only, 0.050 inch will result in the desired loading without exceeding the safe maximum value of S.

The invention enables "live-loading" of valve stem packings to be achieved at similar loadings to conventional "live-loaded" constructions and, as indicated above, does not require the use of separate springs or extended length bolts, thereby enabling it to be used in a wider variety of valves than is convenient or possible conventionally.

What is claimed is:

1. A valve comprising:
    a body defining a passage;
    a valve stem movably disposed within the passage and selectively movable between open and closed positions;
    a packing extending about a portion of the valve stem;
    a sleeve having opposed first and second ends, the first end of the sleeve bearing axially onto and compressing the packing;
    a spigot disposed on the second end of the sleeve and extending radially outward therefrom;
    a clamp attaching two parts of the valve body to each other; and
    at least two bolts extending between and secured to the spigot and the clamp;
    the bolt and the spigot providing an integral spring construction.

2. The valve of claim 1 wherein the spigot comprises a pair of integrally formed arms which extend diametrically across the sleeve in opposed relation to each other.

3. The valve of claim 1 wherein the spigot comprises at least three arms spaced about the sleeve in equidistantly spaced intervals.

4. The valve of claim 2 wherein the integral spring construction is provided by at least one slot disposed within each of the arms of the spigot.

5. The valve of claim 4 wherein:
the sleeve defines an axis; and
each slot extends in a radial direction along a plane generally perpendicular to the axis of the sleeve;
each of the arms defining a pair of substantially parallel branches due to the inclusion of the slot therein.

6. The valve of claim 5 further comprising:
a pair of washers disposed within respective ones of the slots about portions of respective ones of the bolts;
each of the washers having a thickness and reducing the distance between the branches of a respective one of the arms, with the maximum deflection of the branches of each of the arms being reduced to a desired level by the thickness of the washer disposed within the slot thereof.

7. The valve of claim 1 wherein the integral spring construction is provided by each of the bolts having at least one sinusoidal bend formed therein.

8. The valve of claim 7 further comprising at least one stop cooperatively engageable to at least one of the bolts to control loading of the packing.

9. The valve of claim 8 wherein the stop is configured to be selectively adjustable to vary the loading.

10. The valve of claim 1 wherein the spigot is formed from a material selected from group consisting of:
a heat-treated alloy steel; and
a precipitation hardened stainless steel.

11. The valve of claim 1 wherein the packing is fabricated from a multiplicity of rings.

12. The valve of claim 11 wherein the packing includes a lantern ring for conducting any leakage of fluid from the valve to a safe area.

13. The valve of claim 1 further comprising means to limit loading provided by the integral spring construction.

14. The valve of claim 13 wherein the limiting means comprises at least one stop cooperatively engageable to at least one of the bolts and adjustable to provide a desired loading.

15. A kit of parts for a valve of the type having a body defining a passage, the kit comprising:
a valve stem movably disposed within the passage and selectively movable between open and closed positions, a packing surrounding a portion of the valve stem, and a sleeve bearing axially on and compressing the packing,
a spigot engageable to and bearable against the sleeve, the spigot including at least two arms which each have a radially extending slot disposed therein which divides each of the arms into a spaced pair of branches, each of the arms further being configured to receive a bolt for facilitating the attachment of the spigot to the valve; and
a pair of washers configured to fit over respective ones of the bolts between the branches of respective ones of the arms, each of the washers being of a thickness which is adapted to reduce the distance between the branches of a respective one of the arms to permit a maximum predetermined deflection therebetween.

16. A kit of parts for a valve of a type having a body which defines passage, the kit comprising:
a valve stem movably disposed within the passage and movable between open and closed positions, a packing surrounding a portion of the valve stem, and a sleeve bearing axially on and compressing the packing,
a spigot engageable to and bearable against the sleeve, the spigot comprising at least two arms, with each of the arms being configured to receive a bolt for facilitating the attachment of the spigot to the valve, each of the bolts having an integral spring portion whereby the bolt can be stretched to control loading of the packing; and
means for limiting the extension of each of the bolts to permit a maximum predetermined loading to be applied to the packing.

* * * * *